United States Patent [19]

Fry et al.

[11] 3,923,005

[45] Dec. 2, 1975

[54] ALFALFA-BASED ANIMAL LITTER, INCLUDING STARCH

[75] Inventors: Raymond J. Fry, Concord; Michael W. Andreasen, Oakland, both of Calif.

[73] Assignee: The Clorox Company, Oakland, Calif.

[22] Filed: Jan. 25, 1974

[21] Appl. No.: 436,740

[52] U.S. Cl. .................................... 119/1; 106/122
[51] Int. Cl.² .......................................... A01K 1/015
[58] Field of Search .............. 119/1; 127/65, 67, 71; 106/122

[56] References Cited
UNITED STATES PATENTS

| | | | |
|---|---|---|---|
| 3,059,615 | 10/1962 | Kuceski | 119/1 |
| 3,425,397 | 2/1969 | Schulein | 119/1 |
| 3,508,964 | 4/1970 | Roemer | 127/71 |

*Primary Examiner*—Louis G. Mancene
*Assistant Examiner*—Peter K. Skiff
*Attorney, Agent, or Firm*—Phillips, Moore, Weissenberger Lempio & Strabala

[57] ABSTRACT

This invention provides an expanded alfalfa-based composition having particular use as an animal litter, and a process for the production of this composition. Dried alfalfa is admixed with a starch-containing material, and the admixture is treated by a conventional extrusion cooking process to yield an expanded low density pelletized product having improved rate of absorbency, lower odor and better water-stability characteristics.

13 Claims, No Drawings

3,923,005

ALFALFA-BASED ANIMAL LITTER, INCLUDING STARCH

Background of the Invention

This invention relates to a composition having particular use as an animal litter and a process for making this composition. In particular, the invention relates to an expanded alfalfa-based composition characterized by lower odor, improved rate of absorbency and water-stability, and having superior efficiency as an animal litter.

Compositions based on forage crops such as alfalfa are known for their utility as animal litters which effectively absorb animal waste materials and neutralize associated unpleasant odors. Such compositions are exemplified by those described in U.S. Pat. Nos. 3,286,691 to McFadden and 3,425,397 to Schielein, et al, issued respectively on Nov. 22, 1966 and on Feb. 4, 1969. The composition of the McFadden patent comprises a particulate dehydrated alfalfa product, while the composition of the Schielein patent comprises vermiculite or perlite in combination with alfalfa or similar forage crop; both compositions have disclosed utility as animal litters. Similar compositions based on such forage crops are also well-known for their utility as an animal feed, such as the pelletized compressed feed product comprising alfalfa or other forage crop admixed with a starch binder described in U.S. Pat. No. 3,420,671 to Hess, et al, issued on Jan. 7, 1969.

Such known prior art compositions, however, while possesing characteristics attributable at least in part to the alfalfa component which render them useful as animal litter, frequently also possess disadvantages for this use. For example, predominantly clay mixtures have a relatively low absorption capacity, while predominantly alfalfa mixtures tend to have an absorption rate which is lower than desirable. Further, pelletized or formed alfalfa-based products frequently are soluble to some extent in liquid animal wastes, and decompose and/or clump after use, thereby creating a potentially messy situation and nullifying the effectiveness of the product as an animal litter. Additionally, odor control of the deposited animal wastes is not always satisfactory and occasionally the composition itself is the source of unpleasant odors.

Brief Summary and Objects of the Invention

The invention provides an expanded alfalfa-based composition having particular use as an animal litter, and a process of making the composition. Broadly, the invention comprises an admixture of alfalfa or similar chlorophyll-containing grass and a starch-containing material such as wheat middlings, which is extrusion-cooked in a conventional manner to provide a low-density, water-stable, expanded homogeneous particulate product. Preferably, sodium phosphate is added to the starch-alfalfa admixture prior to cooking and extruding to improve the durability and further lower the density of the finished product.

Accordingly, it is an object of the invention to provide an expanded alfalfa-based composition.

It is another object of this invention to provide a highly-porous alfalfa-based composition which is characterized by a relatively high absorbency rate and has improved efficiency as an animal litter.

It is a further object of this invention to provide an alfalfa-based composition which is water-stable and relatively easily deodorized.

It is an additional object of this invention to provide a process for the production of a highly-porous water-stable alfalfa-based composition.

It is yet another object of this invention to provide an animal litter having a high absorption rate, improved waterstability, and increased efficiency on a pound for pound basis.

Other objects and advantages of the invention will be apparent from the following description and example.

Detailed Description of the Invention

Broadly, the composition of this invention comprises an expanded homogeneous alfalfa-based product having a starch binder. Alfalfa, or similar chlorophyll-containing grass is admixed with a starch source such as wheat middlings, and the admixture is processed through a conventional extrusion cooker. The extrudate, which rapidly expands as it leaves the cooker, is sized and pelletized, and then dried to the desired moisture content. The resultant dried, expanded pellets are then preferably aerated to decrease the characteristic odor. Preferably, sodium phosphate is included in the alfalfa-starch admixture to lower the density and increase the durability of the finished product.

The extrusion cooking method utilized to produce the composition of the invention is conventionally employed in the food industry to cook and restructure a great variety of foods. The particular extrusion system employed in the process of this invention is commonly designated High Temperature/Short Time, or HT/ST extrusion cooking which is extremely versatile, and typically includes means for uniformly applying moisture to the ingredient mixture, means for working the ingredients into a dough at relatively low temperatures, for example about 180° to 220°F, means for briefly elevating the temperature of the dough in the final stage of the process, and means for forming the extrudate into the desired size and shape as it emerges from the final die, and means for cutting the shaped extrudate into the desired particle size.

Although various changes that different food elements undergo during the extrusion-cooking process are not completely understood, it is known that starches are gelatinized, or completely ruptured during this process and that gelatinization of the starch component of the extrusion mixture or dough is followed by a great uptake of moisture and a substantial increase in the viscosity of the dough. During subsequent propulsion through the final section of the extrusion cooker, which is typically conical in shape, the dough is rapidly elevated in temperature until the moisture content is well above the boiling point. Since the dough is being propelled through the increasingly restricted area defined by the conical final section, however, the moisture in the dough is substantially unable to expand, and this final section thus acts as a superheater.

The superheated moisture in the dough, which is now stretchable owing to the gelatinization of the starch component, causes the cell structure of the dough to expand rapidly at the instant it is expelled from the extruder. Normally, the degree of this expansion is directly proportional to the temperature of expansion, and the degree of expansion may therefore be controlled within limits by controlling the extrusion temperature. In general, the extrusion temperature is at least sufficient to convert the dough from an amorphous to a colloidal structure.

The above-described principles of extrusion-cooking are employed in the process of the present invention to obtain the expanded alfalfa-based composition of this invention in the following manner:

In the broad aspect of this invention, an admixutre of raw ingredients is prepared comprising dehydrated alfalfa and a suitable starch source, together with any desired additives. This admixture is fed to a conventional extrusion cooker, and moisture is added in the form of steam or water to provide a moisture content in the cooked dough which will expand the dough sufficiently to obtain a preferred density of the finished product of about 23 lbs/cu.ft.

The cooked mixture is then extruded, and the extrudate shaped and cut to the desired form as it leaves the final die. The resultant expanded pellets, which typically have a moisture content of about 35%, are then dried to reduce the moisture content to a preferred level of about 7% to about 8%. The dried pellets are then preferably aerated to decrease their characteristic odor.

The dried pellets having the preferred density are highly porous and thus particularly useful as animal litter. The extensive surface area attributable to this porosity substantially increases the efficiency of the pellets as an animal litter on a pound for pound basis as compared with conventional alfalfa-based litters.

Additionally, the product pellets have an improved rate of absorption over these conventional litters due to the relatively high porosity of these pellets, and it is probable that the increased ease of deodorization of these pellets is at least in part attributable to their porous nature. The usefulness of the dried pellets as an animal litter is further enhanced by the gelatinized starch binder of the product composition, which gives the pellets an improved stability when wet, and substantially prevents structural decomposition of the finished product on contact with liquid animal wastes.

In a preferred embodiment of this invention, the admixture of raw ingredients for extrusion-cooking comprises conventional commercial dehydrated alfalfa pellets and wheat middlings, typically having a starch content of about 15% to about 20%, both of which have been milled to a suitable particle size, preferably about 16 mesh or less. Preferably, this admixture further comprises sodium phosphate, which increases the durability and lowers the density of the finished product.

The dry admixture is fed to a conventional extrusion cooker, and moisture is added to provide a moisture content in the cooked dough of about 20% to about 60%. The dough is then extruded at an extrusion pressure of about 500 to about 600 psi and an extrusion temperature of about 150°C to about 170°C, and the extrudate sized and cut as it leaves the final die to a diameter of from about 5/64 to 14/64 inches (preferred 9/64 inches) and a length of from about 9/64 to about 3/4 inches (preferred 9/64 to 5/16 inches).

The resultant expanded pellets, which typically have a moisture content of about 35%, are then dried to reduce the moisture content to less than about 10%. The dried pellets are then preferably aerated for about 500 hours to substantially remove the characteristic alfalfa odor.

The resultant dried, aerated pellets typically have a density of about 23 lbs/cu.ft. and an absorption capacity over a 24 hour period of about 204% by weight. The pellets have preferred utility as an animal litter owing to their porous characteristics and gelatinized starch binder, as described above. Additionally, the product pellets are substantially free from clumping when wet and absorb without physical expansion.

The extrusion-cooking techniques employed in the process of this invention encompasses numerous variables which may affect the characteristics of the finished product. Of particular importance are the extrusion pressure and temperature, as well as the dwell time, or retention period of the extrusion mixture in the extrusion cooker. In general, for the preferred embodiment described above, a throughput of about 5400 lbs of dough per hour with a screw speed of about 260 rpm, with an extrusion pressure of from about 500 psi to about 600 psi and an extrusion temperature of about 150°C to about 170°C are suitable for the process of this invention. It has been found, however, that for the preferred embodiment, dwell times can vary considerably without substantially affecting the characteristics of the finished product.

Variations in the formulation of the initial ingredient admixture may require compensation by adjustment of one or more of the above or other variables as known in the art to obtain a finished product having the desired characteristics. Variations in size of product, density, moisture content, and other physical characteristics may similarly be obtained by adjustment of the appropriate variable or variables.

The following Example is provided to illustrate the present invention without intent to limit the invention thereto:

Example

Commercial dehydrated alfalfa pellets having a fiber content of about at least 26%, a protein content of no more than 15.5%, and a moisture content of no more than 9.0% were hammer milled to 16 mesh or less, and rescreened to ensure a particle size of 16 mesh or less. The alfalfa particles were admixed with wheat middlings having the following analysis:

| | | | |
|---|---|---|---|
| Crude protein | 17.7% | Dry matter | 89% |
| Crude Fat | 3.6% | Total P | 0.91% |
| Crude Fiber | 7.0% | Ash | 5.5% |
| Crude Calcium | 0.15% | | | which had been similarly milled and rescreened to a particle size of 16 mesh or less, and finely powdered sodium phosphate was added to the alfalfa-starch admixture to give a dry ingredient formulation comprising 86.5% alfalfa particles, 12.5% wheat middlings, and 1.0% sodium phosphate by weight.

The admixture was placed in a holding tank, and then fed to a HT/ST conventional extrusion-cooker having a throughput of 5400 lbs. of dough per hour and a screw speed of 263 rpm. Moisture was added to the extrusion mixture to provide a moisture content in the finished product of 20% to 60%, and the mixture was extruded at an extrusion temperature of 150°C to 170°C and an extrusion pressure of 500 psi to 600 psi. The extrudate was sized by the final die to a diameter of 9/64 inches and cut to lengths of 9/64 inches to 5/16 inches by a conventional rotating cutting device as the extrudate passed through the die.

The resulting pellets which had a moisture content of about 35% were then transferred to a dryer, and the moisture content reduced to 7%. The dried pellets were then aerated for 500 hours in a conventional manner to remove their characteristic alfalfa odor. The resultant dried and aerated product pellets were found to have the following physical properties:

| | | |
|---|---|---|
| Absorbency (24 hour) | — | 204% by weight |
| Moisture Content | — | 7.0% |
| Density | — | 23.7 lbs./cu.ft. |
| Diameter | — | 9/64″ |
| Length | — | 9/64″ – 5/16″ |

What is claimed is:

1. A homogeneous composition useful as an animal litter comprising an admixture of cooked alfalfa and gelatinized starch uniformly distributed one throughout the other to form said homogeneous composition in an expanded form.

2. The composition of claim 1, further comprising sodium phosphate.

3. An expanded pellet for use as an animal litter comprising a homogeneous dispersion of cooked alfalfa particles bound together with gelatinized starch.

4. The pellet of claim 3, wherein the pellet further comprises sodium phosphate.

5. The pellet of claim 4, wherein the expanded pellet has a density of about 23 lbs/cu.ft.

6. A process for the treatment of liquid animal wastes comprising contacting said wastes with a homogeneous composition comprising an admixture of cooked alfalfa, gelatinized starch and an inorganic phosphate uniformly distributed one throughout the other to form said homogeneous composition.

7. A process for the production of a homogeneous expanded alfalfa-based animal litter composition comprising:
preparing an admixture comprising dehydrated alfalfa and a starch source; extrusion cooking said admixture to form said homogeneous composition with said alfalfa and said starch uniformly distributed one throughout the other; and
drying the finished product.

8. The process of claim 7, wherein the production of the expanded pellets comprises:
moistening said admixture to a moisture content of from 20% to 60% by weight; working said admixture into a uniform dough with said alfalfa and said starch uniformly distributed therethroughout and conveying it through the extrusion cooker at a cooking temperature; elevating the temperature of the dough to convert the dough from an amorphous to a colloidal structure in the final section of the extrusion cooker;
extruding the dough to expand the same while sizing and shaping the extrudate; cutting the sized and shaped expanded extrudate to the desired particle size; and drying the resultant expanded particles.

9. The process of claim 8, wherein the admixture further comprises sodium phosphate and the starch source comprises wheat middlings.

10. The process of claim 9, wherein the temperature of the dough in the final section of the extrusion cooker is elevated from about 150°C to about 170°C, and the dough is extruded at a pressure of from about 500 psi to about 600 psi.

11. The process of claim 10, wherein the dough is sized to a diameter of from about 5/64 to about 14/64 inches, and cut to a length of from about 9/64 to about 3/4 inches.

12. A process as in claim 8, wherein the dehydrated alfalfa and the starch source are each in comminuted form.

13. A process as in claim 12, including as an added step after said drying:
aerating said expanded particles to decrease their characteristic odor.

* * * * *